United States Patent
Ko (10) Patent No.: US 10,506,143 B2
(45) Date of Patent: Dec. 10, 2019

(54) CAMERA MODULE AND MOBILE TERMINAL HAVING THE SAME

(71) Applicant: LG ELECTRONICS INC., Seoul (KR)

(72) Inventor: Dongseuck Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/927,724

(22) Filed: Mar. 21, 2018

(65) Prior Publication Data

US 2019/0191062 A1   Jun. 20, 2019

(30) Foreign Application Priority Data

Dec. 18, 2017 (KR) .................... 10-2017-0173926

(51) Int. Cl.
*H04N 5/225* (2006.01)

(52) U.S. Cl.
CPC ......... *H04N 5/2253* (2013.01); *H04N 5/2254* (2013.01); *H04N 5/2258* (2013.01)

(58) Field of Classification Search
None
See application file for complete search history.

(56) References Cited

U.S. PATENT DOCUMENTS

| | | | |
|---|---|---|---|
| 2011/0210947 A1* | 9/2011 | Kawaguchi | G06F 3/0304 345/175 |
| 2011/0304754 A1 | 12/2011 | Tsai | |
| 2012/0038803 A1* | 2/2012 | Tsai | H01L 27/14618 348/294 |
| 2012/0229700 A1 | 9/2012 | Hsiung | |
| 2013/0258044 A1* | 10/2013 | Betts-Lacroix | H04N 13/243 348/36 |
| 2014/0049685 A1 | 2/2014 | Chen | |
| 2015/0124113 A1* | 5/2015 | Rodda | H04N 5/2254 348/218.1 |
| 2016/0284752 A1 | 9/2016 | Shi | |
| 2017/0070672 A1* | 3/2017 | Rodda | H04N 5/2254 |
| 2017/0082823 A1 | 3/2017 | Hwang et al. | |

OTHER PUBLICATIONS

PCT International Application No. PCT/KR2018/003232, Notification of Transmittal of the International Search Report and the Written Opinion of the International Searching Authority, or Declaration dated Sep. 17, 2018, 13 pages.

* cited by examiner

*Primary Examiner* — Mark T Monk
(74) *Attorney, Agent, or Firm* — Lee Hong Degerman Kang & Waimey (57) ABSTRACT

The present invention relates to a camera module and mobile terminal having the same, and more particularly, to a camera module, including: a printed circuit board in which a plurality of sensor holes separated from each other in a length direction are formed; a plurality of image sensors connected to the printed circuit board; and a lens module disposed on a top portion of each of the plurality of image sensors, wherein the image sensors are attached to positions corresponding to the plurality of sensor holes on a bottom surface of the printed circuit board, and mobile terminal having the same.

18 Claims, 5 Drawing Sheets

CAMERA MODULE AND MOBILE TERMINAL HAVING THE SAME

CROSS-REFERENCE TO RELATED APPLICATIONS

Pursuant to 35 U.S.C. § 119(a), this application claims the benefit of earlier filing date and right of priority to Korean Application No. 10-2017-0173926, filed on Dec. 18, 2017, the contents of which are hereby incorporated by reference herein in their entirety.

BACKGROUND OF THE INVENTION

Field of the Invention

The present invention relates to a camera module and mobile terminal having the same, and more particularly, a camera module for obtaining an accurate stereoscopic image (3D image) through a wide angle of view and mobile terminal having the same.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

In addition, the mobile terminal may include a camera module. In recent years, much attention has been paid to a technology for creating a stereoscopic image (i.e., 3D image) using a plurality of cameras.

To create an accurate stereoscopic image and obtain an image with a wide angle of view using a plurality of cameras, predetermined alignment of the plurality of cameras needs to be maintained.

That is, if predetermined alignment of a plurality of camera modules is changed due to an external shock or degradation of the camera modules, the performance thereof may decrease due to the alignment deviation.

SUMMARY OF THE INVENTION

Accordingly, an object of the present invention is to solve the aforementioned problems.

Another object of the present invention is to provide a camera module capable of maintaining predetermined alignment of a plurality of cameras disposed thereon and mobile terminal having the same.

A further object of the present invention is to provide a camera module capable of obtaining an accurate stereoscopic image by preventing at least one of a plurality of cameras from being tilted or rotated and mobile terminal having the same.

A still further object of the present invention is to provide a camera module capable of obtaining an angle of view as wide as possible by preventing at least one of a plurality of cameras from being tilted or rotated and mobile terminal having the same.

To achieve these objects and other advantages, in an aspect of the present invention, provided herein is a camera module, including: a printed circuit board in which a plurality of sensor holes separated from each other in a length direction are formed; a plurality of image sensors connected to the printed circuit board; and a lens module disposed on a top portion of each of the plurality of image sensors, wherein the image sensors may be attached to positions corresponding to the plurality of sensor holes on a bottom surface of the printed circuit board.

In this case, a circumference of a top surface of an image sensor may be attached to a circumference of a sensor hole.

The image sensor may include a sensor body, a sensing unit provided at a center of the sensor body, and a first adhesive part disposed along a circumference of the sensing unit on a top surface of the sensor body.

In addition, the first adhesive part may be attached to the circumference of the sensor hole on the bottom surface of the printed circuit board.

In addition, a first socket for electrically connecting the image sensor to the printed circuit board may be provided in the first adhesive part. Moreover, a second socket corresponding to the first socket may be provided along the circumference of the sensor hole on the bottom surface of the printed circuit board. Further, the first socket may be attached to the second socket The camera module may further include a fixed bracket for fixing the plurality of image sensors at the positions corresponding to the plurality of sensor holes.

In this case, it is preferable that the fixed bracket is attached to the bottom surface of the printed circuit board.

The fixed bracket may include a mounting part on which each of the plurality of image sensors is disposed, and a second adhesive part attached to the bottom surface of the printed circuit board.

In addition, compared to the second adhesive part, the mounting part may be formed to have a concave upward shape.

The mounting part may be formed to have a size corresponding to the image sensor, and the image sensor may be fixed within the mounting unit.

To dissipate heat generated by the printed circuit board and image sensors, the fixed bracket may be made of a heat conduction material.

The plurality of image sensors may be connected to the single printed circuit board. At least one of an infrared emitter, a flash, and a control unit is disposed between the plurality of sensor holes on a top surface of the printed circuit board, and the control unit may be electrically connected to the image sensors, the flash, and the infrared emitter.

The lens module may include a hollow lens housing, at least one lens provided in the lens housing, and an ultraviolet filter provided at a bottom side of the lens in the lens housing, and a bottom of the lens housing may be connected to a circumference of a sensor hole on a top surface of the printed circuit board.

In another aspect of the present invention, provided herein is a mobile terminal, including: a case defining an appearance and having a camera hole; and a camera module disposed on a position corresponding to the camera hole within the case, wherein the camera module may include: a printed circuit board in which a plurality of sensor holes separated from each other in a length direction are formed; a plurality of image sensors connected to the printed circuit board; and a lens module disposed on a top portion of each of the plurality of image sensors, and wherein the image sensors may be attached to positions corresponding to the plurality of sensor holes on a bottom surface of the printed circuit board.

An image sensor may include a sensor body, a sensing unit provided at a center of the sensor body, and a first adhesive part disposed along a circumference of the sensing unit on a top surface of the sensor body, and the first adhesive part may be attached to a circumference of a sensor hole on the bottom surface of the printed circuit board.

In addition, a first socket for electrically connecting the image sensor to the printed circuit board may be provided in the first adhesive part. Moreover, a second socket corresponding to the first socket may be provided along the circumference of the sensor hole on the bottom surface of the printed circuit board. In this case, the first socket may be attached to the second socket.

The mobile terminal may further include a fixed bracket for fixing the plurality of image sensors at the positions corresponding to the plurality of sensor holes, and the fixed bracket may be attached to the bottom surface of the printed circuit board.

The fixed bracket may include a mounting part on which each of the plurality of image sensors is disposed, and a second adhesive part attached to the bottom surface of the printed circuit board.

Compared to the second adhesive part, the mounting part may be formed to have a concave upward shape. In addition, the mounting part may be formed to have a size corresponding to an image sensor, and wherein the image sensor is fixed within the mounting unit.

The mobile terminal may further include at least one of a user input unit for receiving information from a user, a wireless communication unit for communicating with outside, and a display unit for displaying information.

Accordingly, the present invention provides the following effects and/or advantages.

According to the present invention, it is possible to provide a camera module capable of maintaining predetermined alignment of a plurality of cameras disposed thereon and mobile terminal having the same.

In addition, according to the present invention, it is possible to provide a camera module capable of obtaining an accurate stereoscopic image by preventing at least one of a plurality of cameras from being tilted or rotated and mobile terminal having the same.

Moreover, according to the present invention, it is possible to provide a camera module capable of obtaining an angle of view as wide as possible by preventing at least one of a plurality of cameras from being tilted or rotated and mobile terminal having the same.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
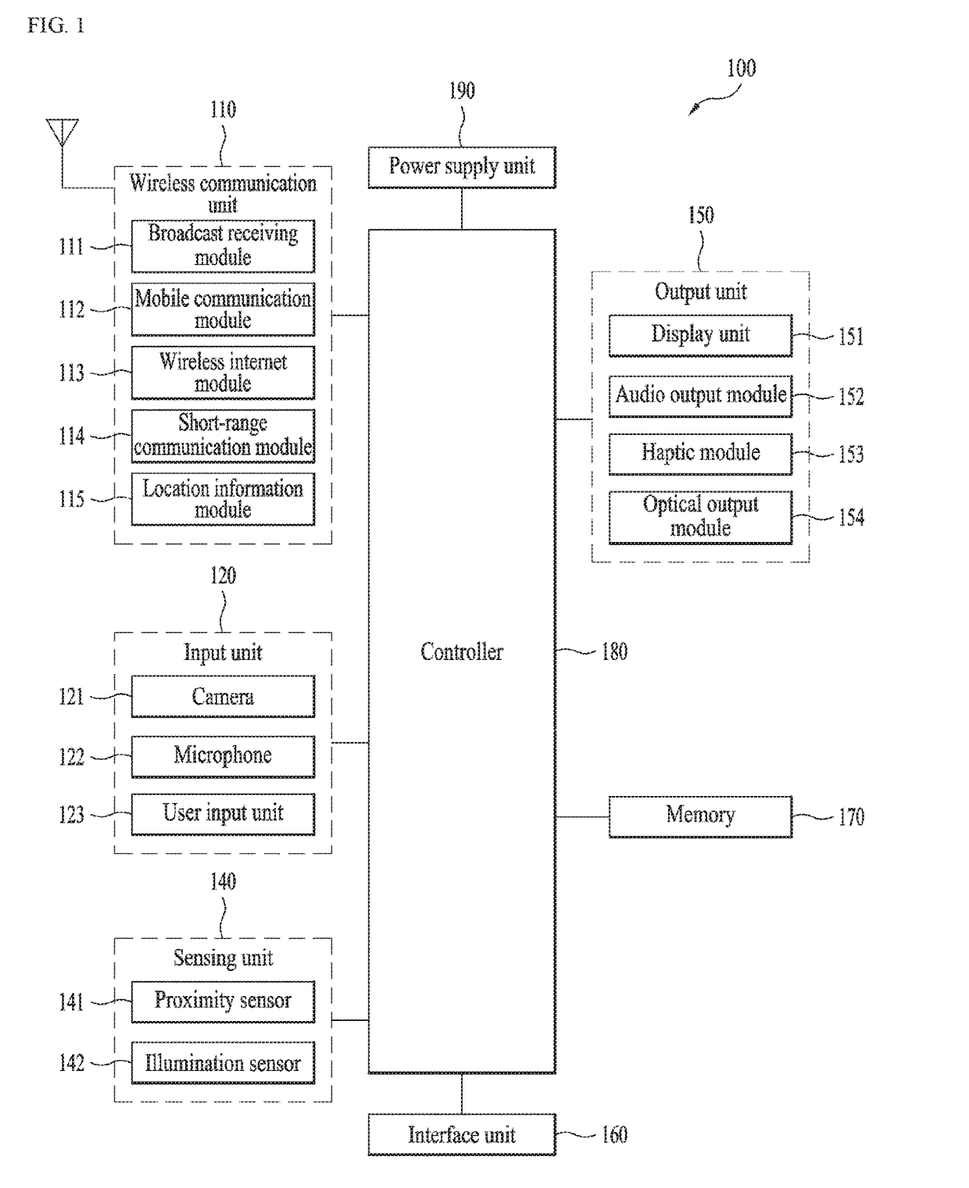
FIG. 1 is a block diagram of a mobile terminal in accordance with the present disclosure.
Figure 2:
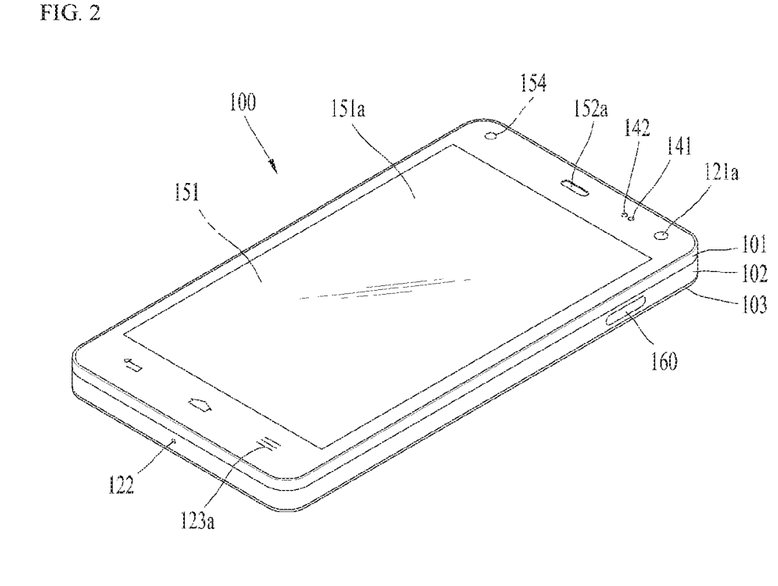
FIGS. 2 and 3 are conceptual views of one example of the mobile terminal, viewed from different directions.
Figure 3:
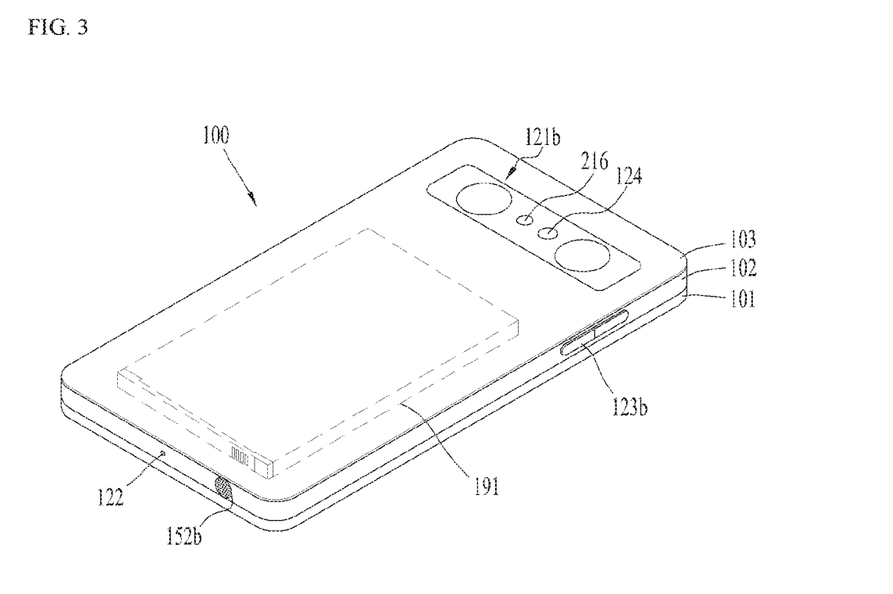

Reference is now made to FIGS. 1-3, where FIG. 1 is a block diagram of a mobile terminal in accordance with the present disclosure, and FIGS. 2 and 3 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1-3 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2 and 3 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3, a flash 124 is shown adjacent to the second camera 121b. When an image of a subject is captured with the camera 121b, the flash 124 may illuminate the subject.

As shown in FIG. 2, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Hereinafter, a description will be given of a camera module, which can be installed in the mobile terminal or used independently, with reference to the remaining accompanying drawings.

Figure 4:
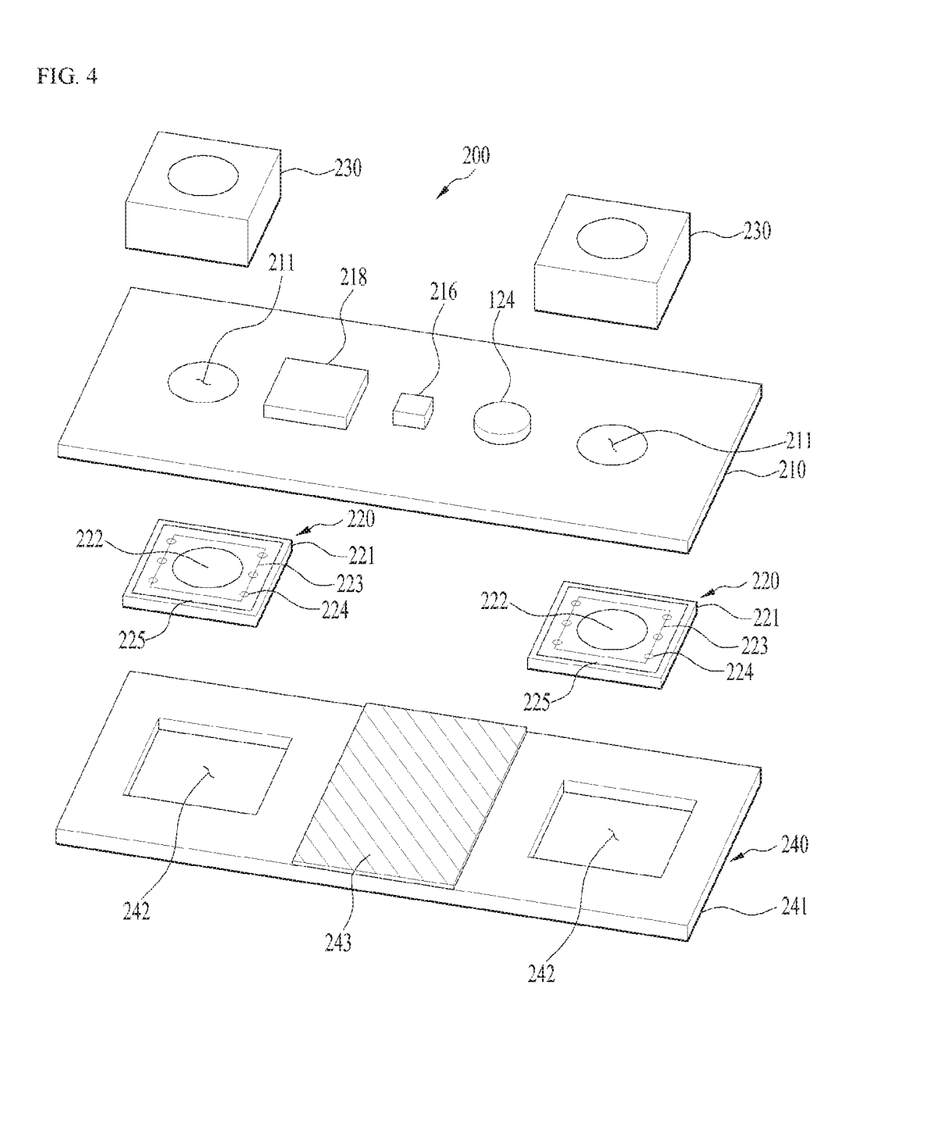
FIG. 4 is a perspective view of a camera module according to an embodiment of the present invention.
Figure 5:
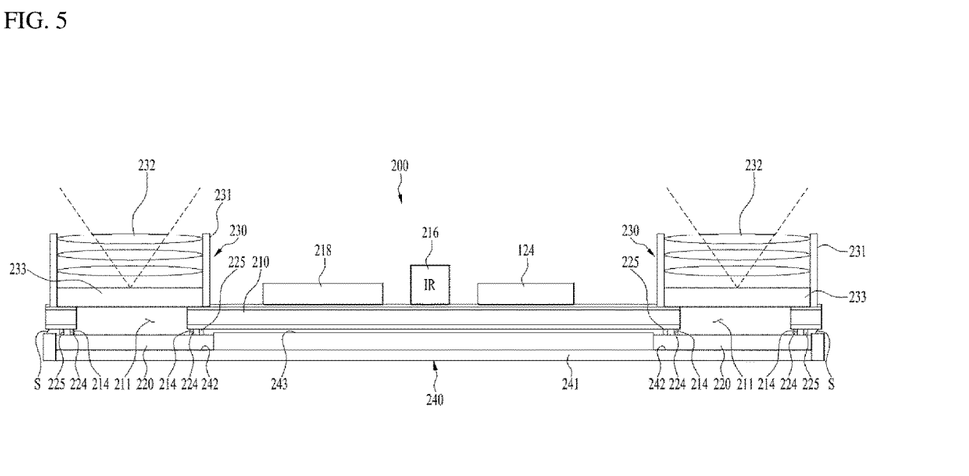
FIG. 5 is a cross-sectional view of a camera module according to an embodiment of the present invention.

FIG. 4 is a perspective view of a camera module according to an embodiment of the present invention, and FIG. 5 is a cross-sectional view of a camera module according to an embodiment of the present invention.

Referring to FIGS. 4 and 5, the above-described camera 121b can be implemented as a camera module 200. This camera module 200 can be used independently or disposed on a mobile terminal or other devices.

The camera module 200 may include a plurality of image sensors 220 to create a stereoscopic image (i.e., 3D image). Although it is described in the aforementioned embodiment that the flash 124 is disposed adjacent to one side of the second camera 121b, when the camera module 220 includes the plurality of image sensors 220, the flash 124 may be disposed between the plurality of image sensors 220 (i.e., between a plurality of lens modules 230, which will be described later).

Meanwhile, to create the stereoscopic image more accurately and allow the image sensed by the plurality of image sensors 220 to have a wide angle of view, the plurality of image sensors 220 should be located at predetermined fixed positions.

That is, if the plurality of image sensors 220 are tilted or rotated due to an external shock or heating of a printed circuit board 210, the stereoscopic image may not be accurately generated, or the angle of view may be relatively decreased.

For example, when the plurality of image sensors 220 are fixed at the predetermined positions, if the image sensors 220 are slightly tilted or rotated, it may significantly affect the accuracy of the stereoscopic image or the angle of view.

Thus, it is desirable that not only the plurality of image sensors 220 are fixed at the predetermined positions but also when there is an external shock or the printed circuit board 210 generates heat, the initial alignment of the plurality of image sensors 220 should be maintained as it is.

According to an embodiment of the present invention, the camera module 200 may include the printed circuit board (PCB) 210, the plurality of image sensors combined with the PCB 210, and lens modules 230 disposed on the plurality of image sensors 220.

The PCB 210 may have a predetermined length. In addition, the PCB may include a plurality of sensor holes 211, which are separated from each other in the length direction. That is, the plurality of sensor holes 211 may be formed such that the sensor holes 211 penetrate the PCB 210 and disposed apart from each other by a predetermined spacing in the length direction.

In addition, the plurality of image sensors 220 may be electrically connected to the PCB 210.

Meanwhile, when the image sensor 220 is disposed on the top surface of the PCB 210, a socket disposed on the top surface of the image sensor 220 should be extended to the bottom surface of the image sensor 220 using an adhesive member such as soldering paste. In this case, the thickness of the adhesive member, for example, soldering paste, may be increased, and it may cause the image sensor to be tilted or rotated. That is, when the image sensor 220 is disposed on the top surface of the PCB 210, there may occur a problem that the initial alignment of the image sensor 220 is changed (i.e., the initial alignment of the image sensor 220 is transformed) due to the thick adhesive member disposed on the bottom surface of the image sensor 220.

According to an embodiment of the present invention, the image sensors 220 may be disposed at positions corresponding to the plurality of sensor holes 211 on the bottom surface of the PCB 210. That is, the top surface of the image sensor 220 may be connected to the bottom surface of the PCB 210.

Since the socket for electrically connecting the image sensor 220 to the PCB 210 is disposed on the top surface of the image sensor 220, when the top surface of the image sensor 220 is directly connected to the bottom surface of the PCB 210, the thickness of the adhesive member may be decreased. In addition, the decreased thickness of the adhesive member may prevent the initial alignment of the plurality of image sensors 220 from being changed.

Specifically, a circumference of the top surface of the image sensor 220 may be attached to that of the sensor hole 211. Thus, an image penetrating through the sensor hole 211 can be sensed or captured by the image sensor 220.

The image sensor 220 may include a sensor body 221, a sensing unit 222 disposed at the center of the sensor body 221, and a first adhesive part 223 disposed on a circumference of the sensing unit 222.

The sensor body 221 may be made of a resin material and form the exterior of the image sensor 220. The sensing unit 222 may be disposed such that it is exposed through the top surface of the sensor body 221, or the sensing unit 222 may be disposed at the center of the sensor body 221. The first adhesive part 223 may be disposed along the circumference of the sensing unit 222, and at least part of the first adhesive part 223 may be disposed on the bottom surface of the PCB 210. For example, the first adhesive part 223 disposed on the top surface of the sensor body 221 may be attached to a circumference of the sensor hole 211 on the bottom surface of the PCB 210 through soldering.

Therefore, the image sensor 220 may be disposed on the bottom surface of the PCB 210 such that the sensing unit 222 can recognize an image from the front (or top) thereof through the sensor hole 211.

More specifically, the first adhesive part 223 may include a first socket 224 for electrically connecting the image sensor 220 to the PCB 210. In addition, a second socket 214 corresponding to the first socket 224 may be disposed on the bottom surface of the PCB 210. The second socket 214 may be disposed along the circumference of the sensor hole 211 on the bottom surface of the PCB 210.

In this case, the first socket 224 may be attached to the second socket 214. For example, the first socket 224 may be attached to the second socket 214 through soldering. That is, since the top surface of the image sensor 220 is attached to the bottom surface of the PCB 210, the first socket 224 may be directly attached to the second socket 214.

Thus, according to the present invention, the thickness of the adhesive member (e.g., soldering paste) can be decreased compared to when the image sensor 200 is disposed on the top surface of the PCB 210 and thus, the first socket 224, which is disposed on the top surface of the image sensor 220, is extended to the bottom surface of the image sensor 220, thereby mitigating the problem that the image sensor 220 is tilted or rotated.

To increase adhesion between the image sensor 220 and PCB 210, an auxiliary adhesive part 225 may be disposed along a circumference of the first adhesive part 223. The auxiliary adhesive part 225 may be disposed along the circumference of the first adhesive part 223 on the top surface of the image sensor 220. The image sensor 220 may also be attached to the bottom surface of the PCB 210 through the auxiliary adhesive part 225. The auxiliary adhesive part 225 may be disposed along the circumference of the first adhesive part 223 by being separated from the first adhesive part 223 by a predetermined spacing.

The lens module 230 may be formed such that external light is focused on the image sensor 220. The lens module 230 may be disposed at a position corresponding to the image sensor 220 on the top surface of the PCB 210. In addition, the number of lens modules 230 may be equal to the number of image sensors 220.

The lens module 230 may include a hollow lens housing 231, at least one lens 232 included in the lens housing 231, and an ultraviolet filter 233 included in the lens housing 231.

The lens housing 231 may be formed such that the top and bottom are open and the inside is empty. To focus light, a plurality of lens 232 may be provided. The ultraviolet filter 233 may be implemented such that ultraviolet rays are blocked and infrared and visible rays pass. The ultraviolet filter 233 may be disposed on the bottom side of the lens 232 within the lens housing 231.

Since the bottom of the lens housing 231 is connected to the top surface of the PCB 210, the lens module 230 can be connected to the PCB 210.

For example, a circumference of the lens housing 231 may be greater than that of the above-described sensor hole 211. In addition, a circumference of the lens 232 and a circumference of ultraviolet filter 233 may also be formed greater than that of the sensor hole 211. Thus, the bottom of the lens housing 231 may be connected to the circumference of the sensor hole 211 on the top surface of the PCB 210.

Meanwhile, the camera module 200 may further include a fixed bracket for maintaining the initial alignment of the plurality of image sensors stably and consistently. The fixed bracket 240 may be connected to the PCB 210 in a state in which the plurality of image sensors 220 are combined with the fixed bracket 240.

That is, the fixed bracket 240 may be formed such that the plurality of image sensors 220 are fixed at the positions corresponding to the plurality of sensor hole 211.

The fixed bracket 240 may be disposed on the bottom surface of the PCB 210. Specifically, in a state in which the image sensor is connected to the top surface of the fixed bracket 240 so that the top surface of the image sensor 220 is exposed, the top surface of the fixed bracket 240 may be attached to the bottom surface of the PCB 210.

In this case, the top surface of the fixed bracket 240 may be attached to the bottom surface of the PCB 210, and at the same time, the top surface of the image sensor 220 may be attached to the bottom surface of the PCB 210 through the above-described first adhesive part 223 and auxiliary adhesive part 225.

The fixed bracket 240 may include a mounting part 242 on which the image sensor 220 is disposed and a second adhesive part 243 to be attached to the bottom surface of the PCB 210. In addition, the fixed bracket 240 may include a plurality of mounting parts 242 according to the number of image sensors 220.

In the illustrated embodiment of the present invention, the fixed bracket 240 includes two mounting parts 242 and the second adhesive part 243 is disposed between the two mounting parts 243. However, when there are three or more image sensors 220 and mounting parts 242 respectively, the second adhesive part 243 may be disposed between neighboring mounting parts 242.

When the second adhesive part 243 is attached to the bottom surface of the PCB 210 using an adhesive member such as a resin, a space S is formed between an edge part, which is formed at both ends of the fixed bracket 240 along the length direction of the fixed bracket 240, and the bottom surface of the PCB 210. Thus, heat generated by the PCB 210 may be dissipated through the space S.

The image sensor 220 may be substantially clamped or attached to the mounting part 242. The number and size of the mounting parts 242 may be determined according to the number and size of the plurality of image sensors 220. In particular, the size of the mounting part 242 may be determined such that it matches the size of the image sensor 220.

The mounting part 242 may be formed to have a concave upward shape. That is, compared to the second adhesive part 243, the mounting part 242 may be depressed upward. In other words, the second adhesive part 243 may protrude upward compared to the mounting part 242.

Specifically, the fixed bracket 240 may include a fixed bracket body 241, and the mounting part 242 and second adhesive part 243 may be disposed on the fixed bracket body 241.

More specifically, the mounting part 242 may be formed on the fixed bracket body 241 such that the mounting part 242 is concavely depressed toward the inside (or downward direction). In addition, the second adhesive part 243 may be disposed on the undepressed top surface of the fixed bracket body 241.

For example, the mounting part 242 may be formed such that it has the same circumference and depth as the image sensor 220. In this case, the image sensor 220 may be clamped to the mounting part in a tight fit manner.

Unlike the above-described example, the circumference and depth of the mounting part 242 may be greater than the circumference and depth of the image sensor 220. In this case, the image sensor 220 may be attached within the mounting part 242 using adhesive. For instance, the bottom and side surfaces of the image sensor 220 may be respectively attached to the bottom and side surfaces of the mounting part 242 using adhesive.

As described above, the image sensor 220 may be substantially fixed to the mounting part 242 either in a tight fit manner or using adhesive.

Meanwhile, the second adhesive part 243 included in the fixed bracket 240 may be attached to the bottom surface of the PCB 210 using flexible resin. This is to prevent the attachment between the PCB 210 and fixed bracket 240 from being damaged due to heat generated by the PCB 210 and image sensor 220.

In addition, to dissipate the heat generated by the PCB 210 and image sensor 220, the fixed bracket 240 may be made of a heat conduction material. That is, to fix the position of the image sensor 220, and at the same time to dissipate the heat generated by the PCB 210 and image sensor 220, the fixed bracket 240 may be made of aluminum, ceramic, aluminum alloy, ceramic alloy, etc.

The above-described single PCB 210 is sufficient to operate the lens module 200. That is, the plurality of image sensors 220 and the plurality of lens modules 230 can be connected to the single PCB 210.

This is because the image sensors 220 are directly and electrically connected to the PCB 210. In addition, various electronics components can be disposed between neighboring lens modules 230 (i.e., between neighboring sensor holes 211) on the top surface of the PCB 210.

As described above, it is possible to efficiently use a space between the neighboring lens modules 230 on the top surface of the PCB 210, and thus the structure of the camera module 200 can be smaller and slimmer.

For example, at least one of an infrared (IR) emitter 216, the flash 124, and a control unit 218 may be disposed between the plurality of sensor holes 211 on the top surface of the PCB 210. Moreover, the control unit 218 can be electrically connected to the image sensors 220, the IR emitter 216, and the flash 124 through the PCB 210.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A camera module, comprising:
a printed circuit board shaped to define a plurality of holes separated at a distance from each other, wherein the printed circuit board includes a top side and a bottom side;
a plurality of image sensors positioned relative to the bottom side of the printed circuit board, wherein each image sensor of the plurality of image sensors is positioned to cooperate with a respective one of the plurality of holes; and
a plurality of lens modules positioned relative to the top side of the printed circuit board, wherein each lens module of the plurality of lens modules is positioned to cooperate with a respective one of the plurality of holes and with a respective one of the plurality of image sensors,
wherein the plurality of image sensors are connected to the printed circuit board,
wherein at least one of an infrared emitter, a flash, or a control unit is located between the plurality of holes on the top side of the printed circuit board, and
wherein the control unit is electrically connected to the plurality of image sensors, the flash, or the infrared emitter.

2. The camera module of claim 1, wherein a circumference of a top surface of each image sensor of the plurality of image sensors is attached to a circumference of a respective one of the plurality of holes.

3. The camera module of claim 2, wherein each image sensor of the plurality of image sensors comprises:
a sensor body;
a sensing unit located at a center of the sensor body; and
a first adhesive part disposed along a circumference of the sensing unit on a top surface of the sensor body, wherein the first adhesive part is attached to the circumference of a respective one of the plurality of holes on the bottom side of the printed circuit board.

4. The camera module of claim 3, further comprising:
a plurality of first sockets, each for electrically connecting a respective one of the plurality of image sensors to the printed circuit board, located in the first adhesive part,
a plurality of second sockets, each located along the circumference of a respective hole of the plurality of holes at the bottom side of the printed circuit board, and
wherein each of the plurality of first sockets is shaped to couple to a respective one of the plurality of second sockets.

5. The camera module of claim 2, further comprising:
a bracket on which the plurality of image sensors at located, wherein the bracket couples to the printed circuit board to permit placement of the plurality of image sensors relative to a respective one of the plurality of holes.

6. The camera module of claim 5, wherein the bracket attaches to the bottom side of the printed circuit board.

7. The camera module of claim 6, wherein the bracket comprises a mounting part for each of the plurality of image sensors, and a second adhesive part that attaches to the bottom side of the printed circuit board.

8. The camera module of claim 7, wherein the mounting part, for each of the plurality of image sensors, is formed to have a concave upward shape, relative to the second adhesive part.

9. The camera module of claim 8, wherein the mounting part, for each of the plurality of image sensors, is formed to have a recess corresponding to the image sensor, and wherein the image sensor is positioned within the corresponding recess of the mounting unit.

10. The camera module of claim 5, wherein the bracket comprises heat conduction material.

11. The camera module of claim 1, wherein each of the plurality of lens modules comprises:
a hollow lens housing;
at least one lens located in the lens housing; and
an ultraviolet filter provided at a bottom side of the at least one lens, wherein a bottom side of the lens housing is connected to the top side of the printed circuit board at a location of a respective one of the plurality of holes.

12. A mobile terminal, comprising:
a case shaped to define a hole; and
a camera module located in the case and positioned to correspond to the camera hole,
wherein the camera module comprises:
a printed circuit board shaped to define a plurality of holes separated at a distance from each other, wherein the printed circuit board includes a top side and a bottom side;
a plurality of image sensors positioned relative to the bottom side of the printed circuit board, wherein each image sensor of the plurality of image sensors is positioned to cooperate with a respective one of the plurality of holes;
a plurality of lens modules positioned relative to the top side of the printed circuit board, wherein each lens module of the plurality of lens modules is positioned to cooperate with a respective one of the plurality of holes and with a respective one of the plurality of image sensors; and
a bracket on which the plurality of image sensors at located, wherein the bracket couples to the printed circuit board to permit placement of the plurality of image sensors relative to a respective one of the plurality of holes.

13. The mobile terminal of claim 12, wherein each image sensor of the plurality of image sensors comprises:
a sensor body;
a sensing unit located at a center of the sensor body; and
a first adhesive part disposed along a circumference of the sensing unit on a top surface of the sensor body, wherein the first adhesive part is attached to the circumference of a respective one of the plurality of holes on the bottom side of the printed circuit board.

14. The mobile terminal of claim 13, further comprising:
a plurality of first sockets, each for electrically connecting a respective one of the plurality of image sensors to the printed circuit board, located in the first adhesive part,
a plurality of second sockets, each located along the circumference of a respective hole of the plurality of holes at the bottom side of the printed circuit board, and
wherein each of the plurality of first sockets is shaped to couple to a respective one of the plurality of second sockets.

15. The mobile terminal of claim 12, wherein the bracket comprises a mounting part for each of the plurality of image sensors, and a second adhesive part that attaches to the bottom side of the printed circuit board.

16. The mobile terminal of claim 15, wherein the mounting part, for each of the plurality of image sensors, is formed to have a concave upward shape, relative to the second adhesive part.

17. The mobile terminal of claim 16, wherein the mounting part, for each of the plurality of image sensors, is formed to have a recess corresponding to the image sensor, and wherein the image sensor is positioned within the corresponding recess of the mounting unit.

18. The mobile terminal of claim 12, further comprising:
at least one of a user input unit for receiving information from a user, a wireless communication unit for performing communications with an external device, or a display for displaying information.

* * * * *